United States Patent
Hammons et al.

(10) Patent No.: US 6,185,231 B1
(45) Date of Patent: Feb. 6, 2001

(54) YB-DOPED:YCOB LASER

(75) Inventors: Dennis Allen Hammons, Orlando, FL (US); Qing Ye, Corning, NY (US); Jason Eichenholz; Bruce H. T. Chai, both of Oviedo, FL (US); Martin Richardson, Geneva, FL (US)

(73) Assignee: University of Central Florida, Orlando, FL (US)

( * ) Notice: Under 35 U.S.C. 154(b), the term of this patent shall be extended for 0 days.

(21) Appl. No.: 09/495,641

(22) Filed: Feb. 1, 2000

Related U.S. Application Data
(60) Provisional application No. 60/118,300, filed on Feb. 2, 1999.

(51) Int. Cl.[7] ........................................ H01S 3/10
(52) U.S. Cl. ..................... 372/20; 372/39; 372/22; 372/10; 372/12; 372/13; 372/41
(58) Field of Search ........................ 372/4, 20, 39, 372/22, 10, 12, 13

(56) References Cited

U.S. PATENT DOCUMENTS

| | | | |
|---|---|---|---|
| 3,462,707 | 8/1969 | Pearson | 331/94.5 |
| 5,123,026 | 6/1992 | Fan et al. | 372/75 |
| 5,280,492 | 1/1994 | Krupke et al. | 372/41 |
| 5,381,428 | 1/1995 | McMahon et al. | 372/20 |
| 5,677,921 | 10/1997 | Schaffers et al. | 372/41 |

FOREIGN PATENT DOCUMENTS

WO96/26464  8/1996 (WO).

OTHER PUBLICATIONS

OA1 Crystal Growth of Yca4O(BO3)3 and Its Orientation, Qing Ye and Bruce H.T. Chai, Journal of Crystal Growth, 1999, No. 197, pp. 228–235.

*Primary Examiner*—Leon Scott, Jr.
(74) *Attorney, Agent, or Firm*—Brian S. Steinberger; Law Offices of Brian S. Steinberger

(57) ABSTRACT

A tunable, solid state laser device with both visible and infrared laser emission is developed with a trivalent ytterbium-doped yttrium calcium oxyborate crystal as the host crystal. The Yb:YCOB crystal generates an infrared fundamental light over a wide bandwidth, from approximately 980 nanometers (nm) to approximately 1100 nm. The bandwidth generated by the Yb:YCOB crystal is approximately 100 nm wide and supports the generation of pulsed infrared light or when self-frequency doubled provides a compact, efficient, source of tunable, visible, blue or green laser light in wavelengths of approximately 490 nm to approximately 550 nm.

25 Claims, 6 Drawing Sheets

X-cavity schematic; f = 12.5cm, 2% O.C., 10cm ROC curved mirrors, 10% YB dopant, 10 mm long Brewster/Brewster cut crystal.

X-cavity schematic; f = 12.5cm, 2% O.C., 10cm ROC curved mirrors, 10% YB dopant, 10 mm long Brewster/Brewster cut crystal.

YB-DOPED:YCOB LASER

This invention relates to solid-state laser devices, and in particular to a new type of tunable ytterbium-doped, self-frequency doubling laser, and claims priority to U.S. Provisional Patent Application S. No. 60/118,300, filed Feb. 2, 1999. This invention is related to U.S. patent application Ser. No. 09/495,770 filed on Feb. 1, 2000, by the same assignee as the subject invention, and now allowed.

BACKGROUND AND PRIOR ART

The laser is a device for the generation of coherent, nearly single-wavelength and single-frequency, highly directional electromagnetic radiation emitted somewhere in the range from submillimeter through ultraviolet and x-ray wavelengths. The word laser is an acronym for the most significant feature of laser action: light amplification by stimulated emission of radiation.

There are many different kinds of lasers, but they all share a crucial element: each contains material capable of amplifying radiation. This material is called the gain medium, because radiation gains energy passing through it. The physical principle responsible for this amplification is called stimulated emission. It was widely recognized that the laser would represent a scientific and technological step of the greatest magnitude, even before T. H. Maiman constructed the first one in 1960. Laser construction generally requires three components for its operation: (1) an active gain medium with energy levels that can be selectively populated; (2) a pumping process to produce population inversion between some of these energy levels; and usually (3) a resonant electromagnetic cavity structure containing the active gain medium, which serves to store the emitted radiation and provide feedback to maintain the coherence of the electromagnetic field.

Many lasers have the capability to emit light over a tunable wavelength range. For a laser to be tunable in wavelength it must possess a laser gain medium whose spectral gain bandwidth is tunable, with temperature or by some other means. Alternatively, the spectral gain of the gain medium can be broad, and an additional wavelength-dependent loss element is added to the resonator to tune the laser emission to different wavelengths within the spectral gain curve.

The lasers of the present invention use a new crystal material, trivalent ytterbium-doped yttrium calcium oxyborate crystals and are referred to herein as $Yb^{3+}:YCa_4O(BO_3)_3$ or Yb:YCOB for easier reference.

A Patent Corporation Treaty (PCT) application numbered WO 96/26464 reports the growth of calcium gadolinium oxyborate, GdCOB, as the first element of a new family of borate crystals, which includes YCOB. However, WO 96/26464 does not disclose or suggest a tunable laser device comprising Yb:YCOB.

In the prior art, there are no disclosures of Yb:YCOB being used as the active gain medium. Further, there are no teachings supporting the use of Yb:YCOB to generate tunable, self-frequency doubled, coherent, visible laser light or ultrashort infrared radiation pulses.

Trivalent ytterbium-doped crystalline laser systems producing optical radiation are reported. U.S. Pat. No. 3,462,707 discloses Yb and Nd doped borate glass host for a non-radiative transfer of energy between Nd ions and Yb ions; there is no mention of frequency doubling. U.S. Pat. No. 5,123,026 disclosed that a Yb-doped host crystal from the garnet family worked as a laser with a separate frequency doubling crystal located within the resonant cavity. Other Yb-doped host material are described in U.S. Pat. Nos. 5,280,492 and 5,381,428; the crystals from the classes of oxides, fluorides, fluoroapatite or glass. Frequency doubling is accomplished by a separate crystal placed in the laser cavity. Tuning is accomplished in U.S. Pat No. 5,381,428 with a birefringent tuning plate, a grating, or a prism also placed within the laser cavity. U.S. Pat. No. 5,677,921 discloses a new class of laser crystals formed from Yb-doped borate fluoride host crystals; these crystals were found to be self-frequency doubling.

More recently, the approach to generating high power, visible laser light has been to use nonlinear optical crystals to convert near-infrared radiation to the visible portion of the spectrum via second harmonic generation (SHG) (sometimes termed frequency doubling and used interchangeably, herein). This process generates a harmonic wavelength which is one-half of the fundamental wavelength. Since the SHG conversion efficiency is a function of the fundamental laser beam intensity, the nonlinear crystal is often placed inside the cavity of a low power continuous wave laser to benefit from the high intracavity fundamental beam intensity.

Thus, in the search for smaller, less expensive, more powerful, multifunctional lasers, the discovery of a new class of laser hosts, the oxyborates, makes possible the combination of linear and nonlinear optical properties in a single active medium. More particularly, the ytterbium-doped oxyborate crystal (Yb:YCOB) of the present invention generates an infrared fundamental light over a relatively wide bandwidth, from approximately 980 nanometers (nm) to approximately 1100 nm. This approximately 100 nm range is a large bandwidth which could support the generation of pulsed infrared light or when self-frequency doubled provides a compact, efficient, source of tunable, visible blue or green laser light with wavelengths of approximately 490 nm to approximately 550 nm.

SUMMARY OF THE INVENTION

The first objective of the present invention is to provide a tunable, infrared and visible light laser that combines the active gain medium and frequency doubler in one single element.

The second objective of this invention is to provide a tunable self-frequency doubled (SFD) laser using the oxyborate family of crystals as the host crystal.

The third objective of this invention is to provide a tunable, compact efficient source of visible laser light.

The fourth objective of this invention would be to provide a source of ultrashort laser pulses by using Yb:YCOB active gain material in a mode-locked laser system.

A preferred embodiment of the invention provides a ytterbium-doped oxyborate crystal (Yb:YCOB) pumped with continuous wave (cw) coherent titanium:Sapphire laser radiation or diode laser light at approximately 905 nm or approximately 977 nm to efficiently generate approximately 530 nm of green laser light.

The optical pumping means which provides energy to the crystal can be selected from one of a coherent or incoherent light pumping source. The incoherent pumping source may be xenon or krypton lamps in the shape of a straight-line or spiral or annular or LED diodes, which can be of pulsed or continuous wave output. The coherent pumping source may be laser light source, such as a single laser diode or a matrix laser diode series, which can also be of pulsed or continuous wave output. Ytterbium systems are particularly well suited for diode pumping.

Further objects and advantages of this invention will be apparent from the following detailed description of a presently preferred embodiment which is illustrated in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The Czochralski method, as reported by Qing Ye and Bruce H. T. Chai in *Journal of Crystal Growth*, 197 (1999) 228–235; "Crystal growth of $YCa_4O(BO_3)_3$ and its orientation" is used to grow the oxyborate crystal for the present invention. When rare-earth elements, such as, ytterbium are added during the crystal growing process, the crystal is said to be "doped" with the rare-earth ions. Doping changes the function of the crystal into an active gain medium. Undoped YCOB crystal is a nonlinear optical medium as disclosed in PCT application WO 96/26464. However, doping the YCOB crystal with a rare-earth, such as erbium or ytterbium, converts the crystal into a nonlinear optical laser crystal. To create a solid-laser device that is capable of tuning and self-frequency doubling, rare-earth elements for doping are selected from the group consisting of erbium, ytterbium, and mixtures thereof.

When the newly formed crystal is grown from the melt, it is generally in cylindrical shape called a crystal "boule." The boule can be cut into a cylindrical rod or other geometric shapes. The flat ends are polished and given an appropriate reflective coating or anti-reflective coating. One end is more reflective than the other; laser light is emitted through the end mirror that is less reflective, i.e., the output coupler.

Figure 1:
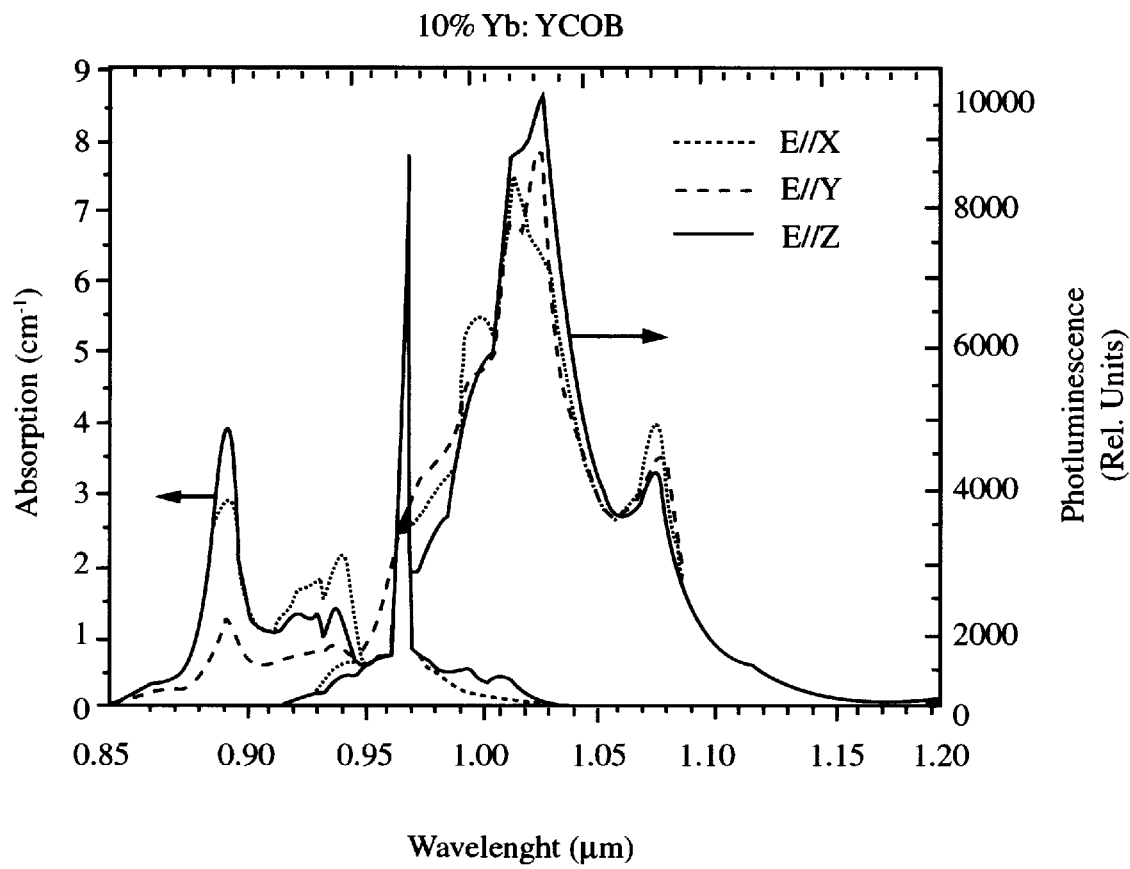
FIG. 1 is the polarized absorption and emission spectra of 10% Yb:YCOB for light parallel to the X, Y, Z optical axes.

Polarized absorption and emission spectra of Yb:YCOB are shown in FIG. 1; confirming that Yb:YCOB has a broad emission band between approximately 980 nm and approximately 1100 nm, allowing for wide wavelength tunability. Undoped YCOB has been shown to have a nonlinear coefficient, deff of 1.1 pm/V, which is between that of other nonlinear crystals KDP (0.37) and BBO (1.94 pm/V). See *J. Appl. Phys.* 36, 276 (1997) and W. Koechner, *Solid State Laser Engineering*, 4th ed. (Springer-Verlag New York, 1996), p. 579. Nonlinear crystals are needed for the frequency doubling laser action.

In experiments, with ytterbium-doped YCOB crystal, several advantages of the Yb:YCOB active gain medium were explored. In addition to the approximately 100 nanometer (nm) wavelength tunability and the capability of self-frequency doubling the fundamental output, it was revealed that ytterbium possesses a wide range of 4f—4f vibrational transitions, resulting in broadband spontaneous emission. In the past, the usefulness of ytterbium was limited by the fact that there are no excitation manifolds accessible beyond the 4f manifold at 10,000 $cm^{-1}$, therefore making flashlamp pumping inefficient. However, the broad absorption band near 900 nm is ideal for diode pumping with near infrared laser diodes, because it eliminates the need for precise control of diode temperature.

Furthermore, the lack of higher energy levels is an advantage for diode pumping because it eliminates the possibility of energy loss due to excited-state absorption and up conversion. Another advantage of ytterbium is in the doping process; when ytterbium replaces yttrium, as in Yb:Y (yttrium)COB, there is virtually no lattice mismatch, and consequently, no concentration quenching.

To reiterate, the broad spectral emission characteristics of ytterbium allow for wavelength tunability and an approximate 100 nm tuning range has been demonstrated using Yb:YCOB. This wide bandwidth has allowed the generation of ultrashort mode-locked pulses for applications in the infrared, and extension to visible wavelengths by virtue of self-frequency doubling.

A common approach to converting the laser wavelength to half its value, for example, from 1100 nm to 550 nm, often used to convert infrared lasers to laser emitting in the visible part of the spectrum, is to use intra-cavity frequency up conversion (IC). The most common IC approach is to incorporate a second crystal, a nonlinear optical crystal, correctly oriented for phase matching, inside the laser resonator, and to adjust the reflectivity of the cavity mirrors to maximize the wavelength converted laser light emission.

It will be shown that the large bandwidth tunability of ytterbium and the nonlinear characteristics of YCOB are combined in Yb:YCOB to generate a tunable source of green visible light as well as an infrared light source.

In FIG. 1 the polarized absorption and emission spectra of Yb:YCOB are shown. The two spectra capture the broad emission band of Yb:YCOB, allowing for a wide tunability range. The upperstate lifetime of Yb:YCOB is 2 to 3 ms, depending on dopant concentration; therefore, fewer diodes are required to store the same amount of energy.

Figure 2:
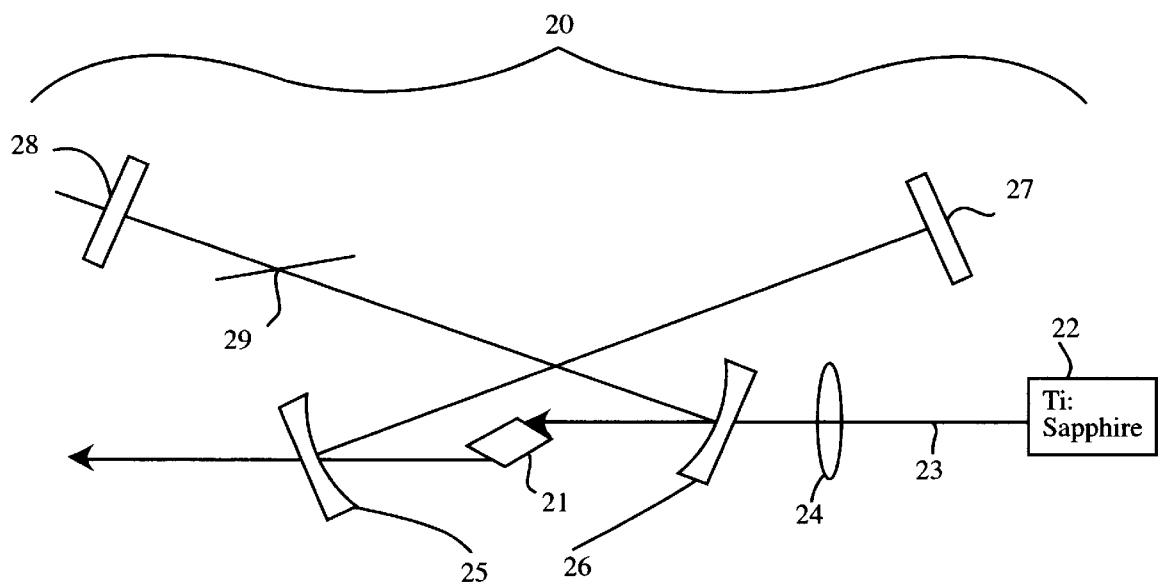
FIG. 2 is an experimental laser cavity design.

The laser apparatus into which the new laser materials may be incorporated is illustrated schematically in FIG. 2. This is just one of a number of optical cavity embodiments. Other embodiments of cavity configurations can include a simple linear cavity, hemispherical cavity, planar—planar cavity, or a ring cavity. In this particular embodiment, an X-Cavity configuration (20), contains a Yb:YCOB crystal (21) which is 10 mm long and was grown with a ytterbium dopant concentration of 10% in the melt and used as the active gain medium. Crystals were grown with Ytterbium dopant concentrations in a range from approximately 10 weight % to approximately 44 weight % in the melt.

Figure 5B:
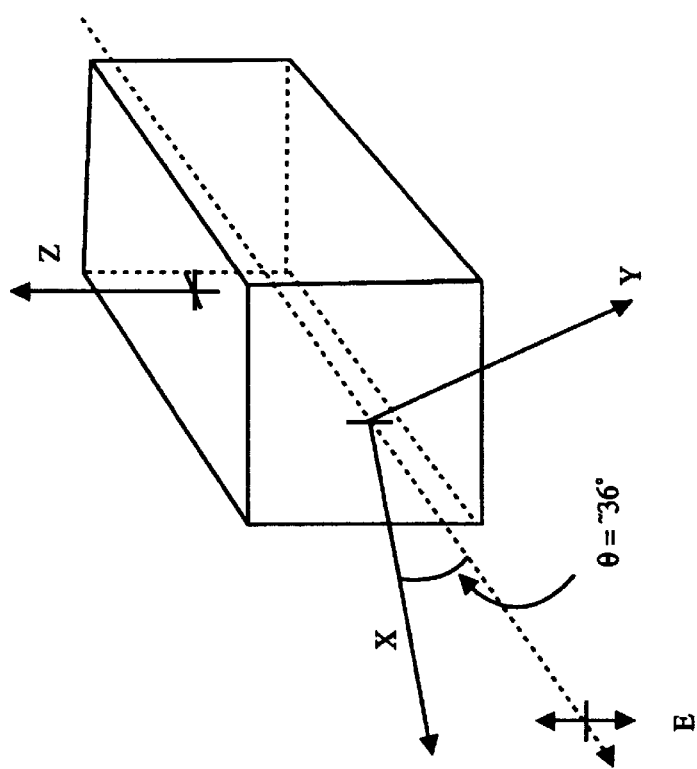
FIG. 5(b) is crystal orientation for optimum self-frequency doubling (SFD) laser action.
Figure 5A:
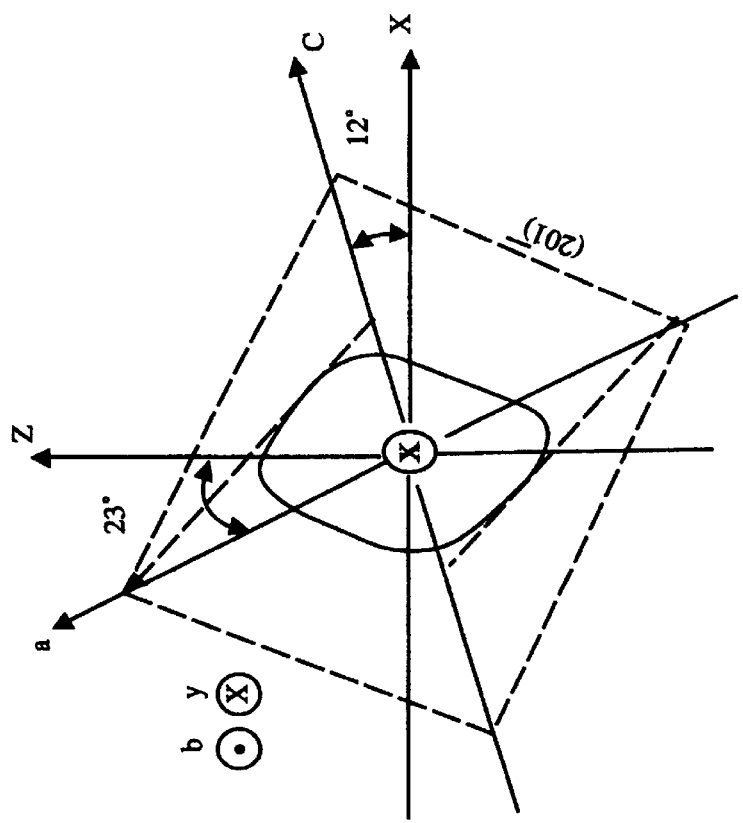
FIG. 5(a) is Orientation of X, Y, Z optical indicatrix axes relative to the crystallographic axes and planes of Yb:YCOB. The typical boule cross-section is also indicated.

The crystal cut is shown in detail in FIGS. 5(a) and 5(b). The crystal was cut such that the laser propagates parallel to the y-axis, and the crystal faces were cut with a 60° Brewster angle to the x-axis, corresponding to a refractive index of 1.7, and with the E-field of the pump parallel to the z-axis of the crystal. As a surrogate for high power InGaAs laser diodes, the pump source was a Ti:Sapphire laser (22) tuned to 900 nm with a maximum power of about 1.4 W. The pump beam (23) was focused into the cavity by a 12.5 cm focal length lens (24) into the cavity. The 10 cm radius of curvature mirrors (25, 26) had a broadband reflectivity from 980 nm to 1220 nm and were positioned at the optimum astigmatic compensation angle of 24° with respect to the pump beam. The high reflector (27) and the 2% output coupler (28) had about 100 nm bandwidth centered at 1064 nm. Tuning was accomplished by inserting a single plate birefringent filter (29) into the cavity between the focusing lens (26) and the output coupler (28). The crystal (21) was cooled on one side by a thermoelectric cooler set at 15° C. The cavity was optimized for a minimum threshold of 184 mW absorbed pump power, with 0.33 W Ti:Sapphire incident upon the focusing lens.

Figure 3:
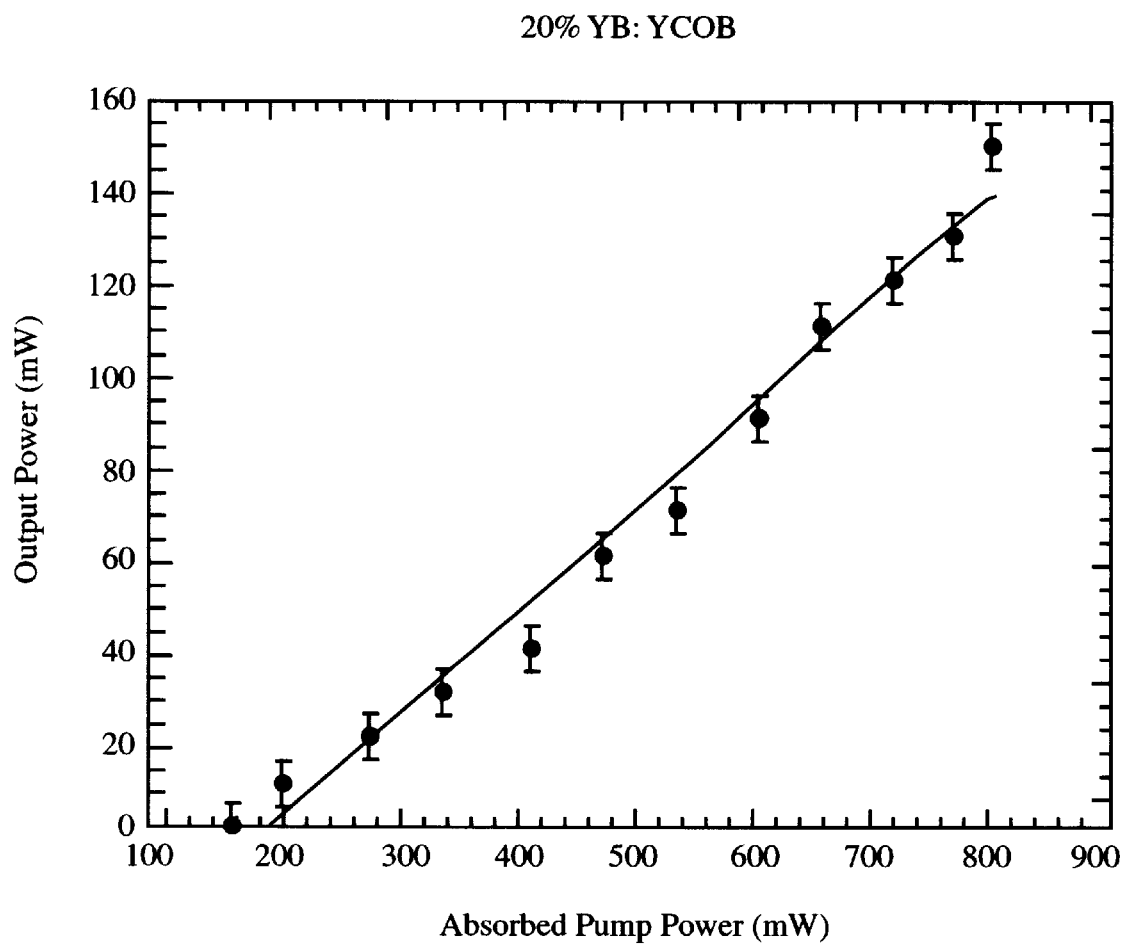
FIG. 3 is a graph of continuous wave (cw) oscillator output power versus absorbed pump power for 20% doped Yb:YCOB crystal.

FIG. 3 shows the observed continuous wave (cw) output as a function of absorbed pump power, showing a slope efficiency of 24% and maximum output power to about 150 mW, which was reduced to about 120 mW by the introduction of the birefringent filter into the cavity.

Figure 4:
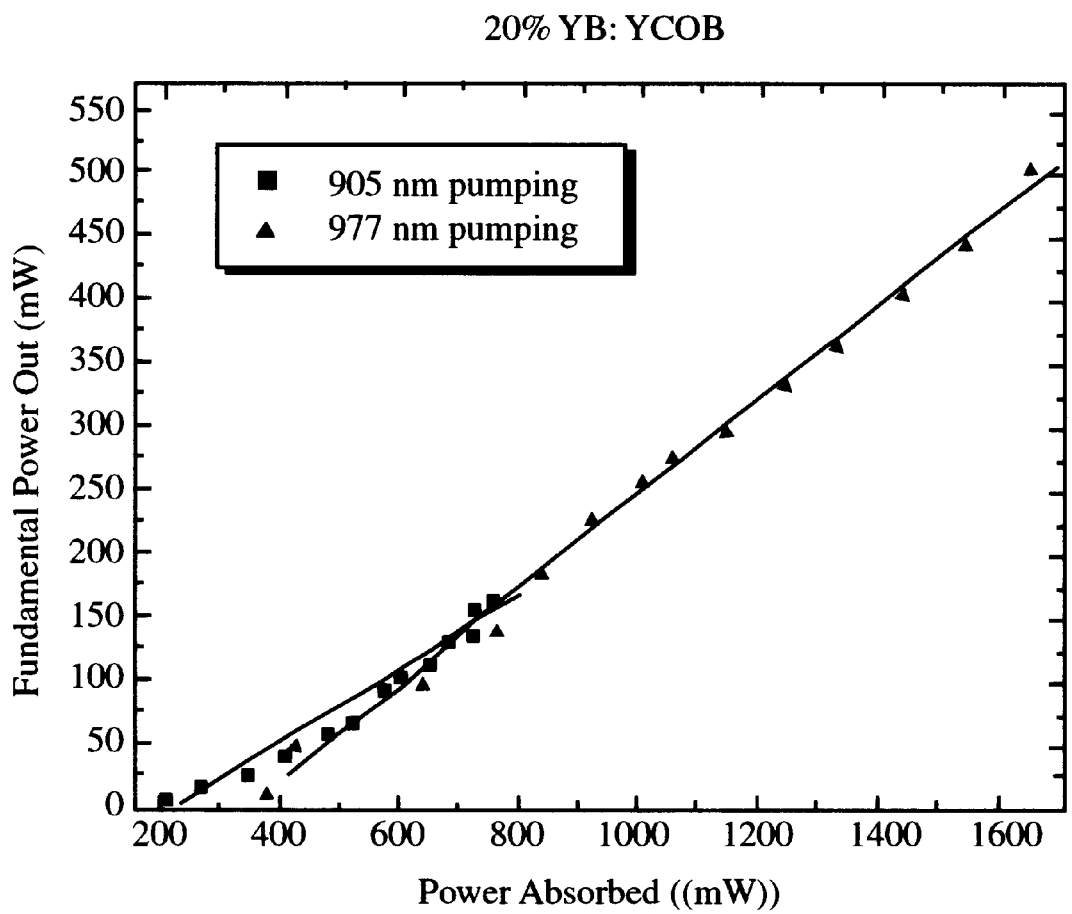
FIG. 4 is the diode-pumped output power versus absorbed pump power for a 20% doped Yb:YCOB crystal.

Another pumping embodiment utilizes single emitter diode pumping. In FIG. 4, the diode-pumped output power versus the absorbed pump power for a 20% Yb:YCOB laser, with a 2% OC, is shown for 1050 nm and 1041 nm wavelengths and for 905 nm and 977 nm pumping, respectively. Slope efficiencies of 27% and 40% were obtained showing improved operation due to a smaller Stokes shift for 977 nm diode-pumping. Operation using both laser-diode pump wavelengths has shown tunable operation from 1030 nm to 1095 nm.

Experiments demonstrating diode-pumped operation were performed using either a 905 nm, 940 nm, or 977 nm diode laser. The hemispherical laser resonator consisted of a flat, highly reflective rear mirror and a 10-cm radius of curvature output coupler (OC). The 20% Yb:YCOB laser rod was cut with the x-axis collinear with the laser axis. The temperature of the crystal was maintained at room temperature (~23° C.) with a thermoelectric cooler. The pump laser polarization was parallel to the Z-axis and was focused into the crystal through the rear mirror. The rear mirror was highly reflecting from 1040 to 1150 nm and over 95% transparent at 977 nm.

In addition to single emitter diode pumping, other pumping means may be used, such as, a diode laser bar; a diode laser array, including Ti:Sapphire diode; and a fiber-optically coupled diode laser source. The diode source wavelength is adjusted to a range between approximately 870 nm and approximately 985 nm.

Figure 6:
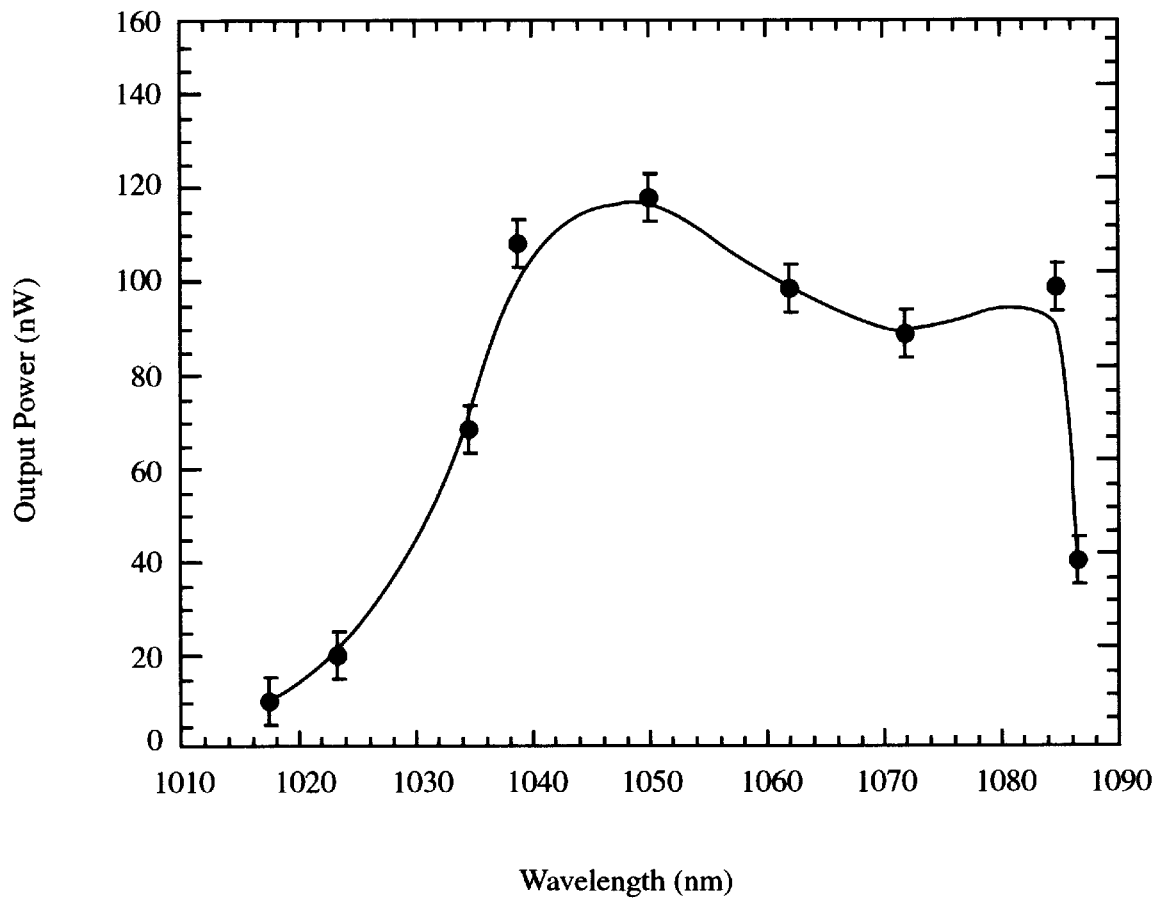
FIG. 6 shows spectral tuning of laser emission from a Yb:YCOB laser.

FIG. 6 is an illustration of the tuning range of the Yb:YCOB laser. The high wavelength limit is set by the available gain at longer wavelengths and the reflectivity of the cavity mirrors. The lower wavelength limit can be affected by self absorption of unpumped laser material in the optical resonator. Optimal design of the pumping; crystal (i.e., length and dopant concentration); and resonator components should allow tuning over the entire gain curve from approximately 980 nm to approximately 1100 nm.

As stated earlier, the resonant laser cavity configuration can be varied to include, but not be limited to, linear configurations, as well as hemispherical systems pumped by a tunable cw Ti:sapphire laser.

The energy stored in a pumped solid-state laser medium can be delivered as a giant pulse in a short time by the use of Q-switching (quality factor switching). This technique can be applied in the present invention. It makes use of the idea that if the resonant cavity structure is maintained at a very low-Q level while the active medium is pumped, a high level of population inversion can be reached. If the cavity is then suddenly switched to a high-Q state, stimulate emission occurs rapidly, and radiation is emitted in a short pulse. Other means for generating short pulses that are suitable for the present invention, include, but are not limited to, electro-optic elements, or acousto-optic elements as the switch in the laser cavity. Mode-locking may also be applied to generate femtosecond pulses.

It is shown that the new material, Yb:YCOB, is a promising laser crystal with wide emission bandwidth, broad absorption at approximately 900 nm, and non-linear properties that allow for the possibility of an inexpensive, rugged, and compact diode pumped tunable and/or mode locked laser system capable of generating ultrashort pulses, including sub-100 femtosecond pulses in the infrared and coherent green visible light via self-frequency doubling.

While the invention has been described, disclosed, illustrated and shown in various terms of certain embodiments or modifications which it is presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A tunable, solid state laser device with visible and infrared optical effects, comprising:
    a) a laser cavity with reflective means and output coupler;
    b) a self-frequency doubling, active gain medium disposed in said laser cavity producing a longitudinal mode laser emission, the active gain medium being trivalent rare-earth doped yttrium calcium oxyborate;
    c) means for pumping said active gain medium; and
    d) means for tuning within said laser cavity said laser emission to one of a plurality of wavelengths having a wavelength tuning range of between approximately 900 to approximately 1200 nm.

2. The solid-state laser of claim 1, wherein said active gain medium is a trivalent rare-earth doped yttrium calcium oxyborate [$Re^{3+}$:$YCa_4O(BO_3)_3$] wherein $Re^{3+}$ is selected from the group consisting of erbium, ytterbium, and mixtures thereof.

3. The solid-state laser of claim 2, wherein said active gain medium is trivalent erbium-doped yttrium calcium oxyborate (Er:YCOB).

4. The solid-state laser of claim 2, wherein said active gain medium comprises YCOB doped with a mixture of erbium and ytterbium.

5. The solid-state laser of claim 2, wherein the active gain medium is trivalent ytterbium-doped yttrium calcium oxyborate [$Yb^{3+}$:$YCa_4O(BO_3)_3$].

6. The solid-state laser of claim 5, wherein said wavelength tuning range comprises wavelengths between approximately 980 nm and approximately 1100 nm.

7. The solid-state laser of claim 5, wherein said active gain medium generates an infrared fundamental light from approximately 980 nm to approximately 1100 nm and is thereafter self-frequency doubled to visible laser light having a wavelength from approximately 490 nm to approximately 550 nm.

8. The solid-state laser of claim 5, wherein said active gain medium generates an infrared fundamental light from approximately 1018 nm to approximately 1087 nm and is thereafter self-frequency doubled to visible green light having a wavelength from approximately 509 nm to approximately 544 nm.

9. The solid-state laser of claim 1, wherein said active gain medium comprises a host material doped with an amount of ytterbium ions.

10. The solid-state laser of claim 9, wherein said host material is yttrium calcium oxyborate, $YCa_4O(BO_3)_3$, YCOB.

11. The solid-state laser of claim 9, wherein the doping amount of said ytterbium ions is in a range from approximately 2 weight % to approximately 44 weight % of the YCOB host material.

12. The solid-state laser of claim 11, wherein the doping amount of ytterbium ions is approximately 20 weight % of the YCOB host material.

13. The solid-state laser of claim 1, wherein said tuning means comprises:

(a) a tuning element; and (b) means for rotating said tuning element about its axis to tune the laser emission to a wavelength within said wavelength tuning range.

14. The solid-state laser of claim 13, wherein said tuning element is disposed within said laser cavity.

15. The solid-state laser of claim 13, wherein said tuning element is selected from the group consisting of a birefringent tuning plate and a prism.

16. The solid-state laser of claim 1, wherein said pumping means is selected from a group consisting of a single emitter diode, a diode laser bar, a diode laser array and a fiber-optically coupled diode laser source.

17. The solid-state laser of claim 16, wherein said diode laser array comprises a titanium:sapphire laser.

18. The solid-state laser of claims 16 or 17, wherein the diode source wavelength is between approximately 870 nm and approximately 985 nm.

19. The solid-state laser of claims 16 or 17, wherein the diode laser pumps the active gain medium at approximately 905 nm, approximately 940 nm and approximately 977 nm wavelength.

20. A method of lasing an oxyborate crystal at a range between approximately 1018 nm and approximately 1087 nm, comprising the steps of:

(a) emitting optical radiation from a pump source, the pump source being tuned in a range between approximately 900 nm to approximately 1200 nm, and selected from one of a coherent pumping source and an incoherent pumping source; and (b) pumping a gain medium composed of trivalent ytterbium-doped: yttrium, calcium oxyborate [$Yb^{3+}$:$YCa_4O(BO_3)_3$] in a resonator cavity; and (c) producing a tunable, self-frequency doubled, green, visible light emission in the range between approximately 509 nm and approximately 544 nm.

21. The method of lasing an oxyborate crystal of claim 20, wherein the resonator cavity includes:

(a) a reflectivity mirror;

(b) a tuning means consisting of a single plate birefringent filter; and (c) an output coupler.

22. The method of lasing an oxyborate crystal of claim 20, wherein the pump source is a pulsed laser selected from the group consisting of an active acousto-optic Q-switching device, an active electro-optic Q-switching device, a passive acousto-optic Q-switching device, a passive electro-optic Q-switching device, an active mode-locking device, and a passive-mode locking device.

23. A method of lasing an oxyborate crystal at a range between approximately 1018 nm and approximately 1087 nm, comprising the steps of:

(a) emitting optical radiation from a pump source, the pump source being tuned in a range betweem approximately 900 nm to approximately 1200 nm;

(b) pumping a gain medium composed of trivalent ytterbium-doped: yttrium-calcium oxyborate [$Yb^{3+}$:$YCa_4O(BO_3)_3$] in a resonator cavity with optical radiation; and (c) producing ultrashort infrared radiation pulsed light.

24. The method of claim 23, wherein the ultrashort infrared pulsed emissions are generated as sub-100 femtosecond pulsed laser light.

25. A solid-state laser device wherein the single active gain medium is trivalent ytterbium-doped yttrium calcium oxyborate crystal [$Yb^{3+}$:$YCa_4O(BO_3)_3$].

* * * * *